(12) United States Patent
Mayor et al.

(10) Patent No.: US 7,050,775 B2
(45) Date of Patent: May 23, 2006

(54) METHOD AND APPARATUS FOR SECURELY ENABLING A RADIO COMMUNICATION UNIT FROM STANDBY MODE

(75) Inventors: Michael A. Mayor, Fort Wayne, IN (US); Ning Lu, Parsippany, NJ (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 465 days.

(21) Appl. No.: 10/192,559

(22) Filed: Jul. 11, 2002

(65) Prior Publication Data

US 2004/0009759 A1  Jan. 15, 2004

(51) Int. Cl.
*H04B 7/00* (2006.01)

(52) U.S. Cl. .................. 455/258; 455/208; 455/260; 455/265

(58) Field of Classification Search ............... 455/403, 455/501, 502, 513, 63.1, 67.11, 67.13, 67.16, 455/701, 75, 115.1, 115.3, 205, 255, 258
See application file for complete search history.

(56) References Cited

U.S. PATENT DOCUMENTS

| | | | | |
|---|---|---|---|---|
| 4,024,475 A | * | 5/1977 | Bragas et al. ............... | 455/228 |
| 5,025,455 A | * | 6/1991 | Nguyen ....................... | 375/327 |
| 5,475,705 A | * | 12/1995 | Dent ............................ | 375/333 |
| 5,862,155 A | * | 1/1999 | Lomp et al. ................. | 714/792 |
| 5,870,427 A | | 2/1999 | Tiedemann, Jr. et al. | |
| 5,995,536 A | * | 11/1999 | Arkhipkin et al. ........... | 375/141 |
| 6,091,785 A | * | 7/2000 | Lennen ....................... | 375/316 |
| 6,212,174 B1 | * | 4/2001 | Lomp et al. ................. | 370/335 |
| 6,345,066 B1 | | 2/2002 | Haartsen | |
| 6,581,164 B1 | * | 6/2003 | Felts et al. ................... | 713/400 |

FOREIGN PATENT DOCUMENTS

| | | |
|---|---|---|
| EP | 0 940 942 A2 | 9/1999 |
| WO | WO 00/45559 | 8/2000 |

* cited by examiner

*Primary Examiner*—Nguyen T. Vo
*Assistant Examiner*—Thuan T. Nguyen
(74) *Attorney, Agent, or Firm*—Edell, Shapiro, Finnan LLC

(57) ABSTRACT

A radio communication unit employs passive devices and a loop filter to receive a coded frequency modulated wakeup or synchronization signal that enables the receiving radio unit and initiates communications. The loop filter simultaneously tracks phase and frequency and provides smoothing to enable synchronization with weak signals (e.g., signals that typically do not enable a standard phase locked loop (PLL) to lock). In particular, when the communication unit is in a standby mode, the passive circuits of the present invention are receiving energy from a unit antenna and initially function as a phase locked loop (PLL) to lock onto an incoming signal. The wakeup or synchronization signal includes a series of tones at different frequencies, where the specific sequence is prearranged between the transmitting and receiving units. When each tone in the sequence has been detected by the receiving unit, the unit is enabled for communications.

41 Claims, 9 Drawing Sheets

DIGITAL MATCHED FILTER OPERATION

MATCHED SEQUENCE  1 1 1 -1
                  1 1 1 -1   ⟹  1 + 1 + 1 + 1 = 4

UN-MATCHED SEQUENCE  1 1 -1 1
                     1 1 1 -1  ⟹  1 + 1 - 1 - 1 = 0

MATCHED AND UN-MATCHED SEQUENCES DMF OUTPUT

SYSTEM DIAGRAM

BASIC PHASE LOCKED LOOP (PLL)

DOUBLE LOOP FILTER- SIMULTANEOUSLY TRACKING PHASE AND FREQUENCY

MULTI-FREQUENCY WAVEFORM - TIME DOMAIN

PHASE LOCK AND TRACKING

METHOD AND APPARATUS FOR SECURELY ENABLING A RADIO COMMUNICATION UNIT FROM STANDBY MODE

BACKGROUND OF THE INVENTION

1. Technical Field

The present invention pertains to communication systems. In particular, the present invention pertains to secure initiation of communications within radio communication systems. The present invention may be applied to radio communication systems including individual communication units with a tuner capable of tuning to a wide set of frequencies. In exemplary embodiments, the present invention is applied to Spread Spectrum Systems (e.g., Direct Sequence, Frequency Hop and Hybrid) with individual communication units including a receiver capable of tuning to different frequencies, and the systems employing waveforms in the form of coded spread spectrum signals, where the signals are expanded in bandwidth via a spreading code.

2. Discussion of Related Art

Radio or wireless communication system operation typically includes an initial synchronization between transmitting and receiving units. A signal may be constantly transmitted into the environment to synchronize receiving units that are enabled at random times. This technique is employed by standard cellular communication systems, where a fixed base station constantly transmits a synchronization signal. In highly mobile systems without base stations, the synchronization is typically achieved in other fashions by the individual units. Further, critical systems (e.g., military or emergency management systems) require a high degree of reliability and resistance to intentional and/or unintentional spurious signals.

A manner of enhancing security and reliability within radio communication systems includes employment of encoded signals, such as spread spectrum signals. However, the processing required by the individual communication units to employ encoded signals significantly increases power consumption by those units. By way of example, spread spectrum communication systems are described to illustrate the significant processing performed by the individual communication units to employ encoded (e.g., spread spectrum) signals. In particular, the operation of a Direct Sequence Spread Spectrum (DSSS) communication unit includes spreading of a baseband signal (e.g., bandwidth expansion) by use of pseudonoise (PN) codes. The frequency rate of the codes greatly exceeds that of the baseband signal, where each transition or code symbol is commonly referred to as a "chip". The codes or chips are basically modulated onto the baseband signal containing data and the resulting signal is mixed with an RF carrier signal and transmitted for reception by the appropriate receiving radio or communication units.

A cross correlation of an incoming signal with a suitable code replica by a digital matched filter (DMF) within the receiving communication unit produces an energy peak at the exact match, thereby rejecting or filtering other pseudonoise codes and background noise and interference. The power ratio between the incoming signal and the digital matched filter output signal is commonly referred to as processing gain (PG) and is defined by the filter length (e.g., quantity of filter stages) or quantity of chips per baseband signal. The power gain may be expressed in terms of decibels (dB) as:

$$PG_{dB}=10*\log_{10} \text{ (quantity of chips/1 symbol) or}$$

$$PG_{dB}=10*\log_{10} \text{ (Chipping or Code Rate/Symbol Rate).}$$

For example, when each data symbol within the baseband signal is spread by one-hundred twenty-eight chips, the processing gain is:

$$PG_{dB}=10*\log_{10} (128/1)=21 \text{ dB.}$$

Further, the above equations indicate a 32 MHz chip or code rate when the power gain is 21 dB and the symbol rate is 250 kilo symbols per second (ksps) with each data symbol spread by one-hundred twenty-eight chips.

Pseudonoise orthogonal or quasi-orthogonal codes may be selected to correlate exactly with a peak power output of the digital matched filter when the incoming signal code and replica codes match, and to produce a filter output of zero when these codes do not match (e.g., even if the codes are offset or shifted by one position). Operation of the digital matched filter is illustrated, by way of example only, in FIGS. 1–2. Specifically, an incoming signal including bi-phase modulated chips or codes is correlated with a stored replica code for a given time interval. Each chip within the incoming signal is multiplied by the corresponding chip in the replica code, where the individual products are summed to produce a correlation result. The filter operation may be expressed as:

$$\sum_{k=1}^{N} c_k r_k$$

where $c_k$ represents the incoming chip sequence, $r_k$ is the stored replica code and N represents the quantity of chips in the code.

Referring to FIG. 2, the filter is employed, by way of example only, with respect to short Barker codes. Specifically, an incoming signal with a code of 1, 1, 1, −1 is matched exactly to the stored replica code. The correlation value of four (e.g., the sum of the products of the corresponding chips, or (1×1)+(1×1)+(1×1)+(−1×−1)=4) indicates a peak power output of the filter. However, when an incoming signal with a code of 1, 1, −1, 1 does not match with a stored replica code of 1, 1, 1, −1, the filter provides a correlation value of zero (e.g., the sum of the products of the corresponding chips, or (1×1)+(1×1)+(−1×1)+(1×−1)=0) indicating the absence of a match.

Signal to Noise Ratio (SNR) is commonly defined as the ratio of the average signal power to the average noise power and is preferably measured in decibels. The average signal power is determined over the signal bandwidth, where the bandwidth for a spread spectrum signal is greater than that for a narrowband or baseband signal. For example, a baseband signal with 25 KHz of bandwidth and expanded at a ratio of one-hundred produces a spread signal with 25 KHz*100=2.5 MHz. The baseband signal includes, for a transmitted power of one Watt, a signal power of ¹⁄₂₅ KHz =0.040 Watts/Hz or 40 milliWatts/Hz, while the spread signal includes 1/2.5 MHz=400 NanoWatts/Hz. Thus, the spectral density of the narrowband or baseband signal contains more power in a narrow band, while the spread signal contains the same power for a sufficiently greater bandwidth with a lower peak power. This enables the spread signal to reside within or be camouflaged by the environment noise.

The pseudonoise codes provide a manner for a receiving unit to basically identify and differentiate between messages directed to that unit and other units, and further ensures that other transmissions within the surrounding environment are not erroneously considered as messages addressed to the receiving unit. Moreover, the pseudonoise codes enable secure and reliable communications in the presence of background and/or multi-user interference, while the bandwidth expansion of the baseband signal distributes the signal power over a greater bandwidth, thereby reducing the power spectral density of that signal in maximum amplitude and reducing visibility of the signal in the environment.

The security provided by the pseudonoise codes is based on the requirement that the receivers have knowledge of the specific code being transmitted in order to acquire and demodulate the signal. Accordingly, long or lengthy pseudonoise codes are utilized in some commercial systems, where subsections of the code are used to spread symbols with subsequent symbols being spread by different subsections. This is typically employed by military systems having security as a key requirement.

Accordingly, the spread spectrum receiving units perform significant processing to decode a transmitted signal, thereby substantially increasing unit power consumption. Further, the electronic circuitry of the receiving units include digital matched filters (DMFs) that match the transmitted codes to stored code replicas as described above. Thus, the receiving units must sample the environment and perform the filtering at the high chipping or code rate. For example, a baseband signal, b, that is expanded by N chips requires a digital matched filter of a receiving unit to perform numerous operations, $N_{ops}$ (e.g., including N multiplications and N−1 subsequent additions), to compare or match the stored code replica to the received signal as described above. Since the digital matched filter operates at the sampling rate which, to satisfy the Nyquist principle, must be at least twice the chip rate (i.e., two samples per chip), the following quantity of operations are typically performed:

$$N_{ops}=2*N \text{ (multiplications)}+2*[N-1] \text{ (additions)}$$

These operations continue until the acquisition symbols (e.g., symbols within the transmitted codes) are exhausted. For example, the total quantity of operations, $T_{ops}$, for S acquisition symbols may be expressed as:

$$T_{ops}=S*N_{ops}$$

The filter continues to operate at this rate even during intervals of silence or low transmission rates in order to detect a transmission directed to that receiving unit. This especially occurs in systems employing Code Division Multiple Access (CDMA), where each communication unit or user is assigned a different code for communication.

With respect to Frequency Hop Spread Spectrum systems, the baseband signal is shifted in frequency based on a pseudonoise code to spread the signal over a wider bandwidth. The sequence in which the frequencies are transmitted is derived from the code, while the shifting or hopping rate is a function of the data or information rate. In order to acquire the signal, a receiving unit is typically required to shift or hop frequencies at a compatible rate in accordance with the spreading code. This similarly increases power consumption by the receiving unit. Hybrid Spread Spectrum systems typically employ a combination of direct sequence and frequency hopping techniques and thereby experience a compounded problem.

Since operation of a receiving unit to acquire an encoded transmitted signal significantly increases unit power consumption, the secure communication techniques described above are not economical or feasible for battery operated small devices, especially when there are long intervals of standby or silence.

OBJECTS AND SUMMARY OF THE INVENTION

Accordingly, it is an object of the present invention to employ a passive circuit within a communication system radio unit that receives a coded wakeup or synchronization signal to establish synchronization and initiate communications with minimal power and enhanced reliability and security. The passive circuit further reasonably assures that the synchronization signal is intended only for the receiving radio unit.

It is another object of the present invention to generate and transmit a wakeup signal that is difficult for a hostile or malicious third party to duplicate, thereby limiting false enabling of the radio unit and unnecessary power consumption.

The aforesaid objects may be achieved individually and/or in combination, and it is not intended that the present invention be construed as requiring two or more of the objects to be combined unless expressly required by the claims attached hereto.

According to the present invention, a radio communication unit employs passive devices and a loop filter to receive with enhanced reliability and security a coded frequency modulated (FM; e.g., digital signals frequency modulated for transmission) wakeup or synchronization signal that enables the receiving radio unit and initiates communications (e.g., the synchronization signal may trigger spread spectrum digital circuits to search for pseudonoise codes and/or facilitate frequency hopping in accordance with those codes to acquire transmitted signals). The coded synchronization signal may be transmitted and reliably received in conditions producing a low signal to noise ratio.

The loop filter simultaneously tracks phase and frequency and provides smoothing to enable synchronization with weak signals (e.g., signals that typically do not enable a standard phase locked loop (PLL) to lock). In particular, when the communication unit is in a standby mode, the passive circuits of the present invention are receiving energy from a unit antenna and initially function as a phase locked loop (PLL) to lock onto an incoming signal. A phase locked loop basically controls the phase of a frequency modulated oscillator output signal to follow that of an input signal, and is typically employed as an effective FM demodulator. The loop filter of the present invention smoothes and tracks the phase and frequency of the incoming signal with respect to a signal generated by a numerically controlled oscillator (NCO) in order to facilitate detection of the synchronization signal. The wakeup or synchronization signal includes a series of tones at different frequencies, where the specific sequence is prearranged between the transmitting and receiving units. Each tone is further transmitted with a predetermined or prearranged phase. The tones follow a precise pre-established sequence and do not include specific time requirements (e.g., there is no specific time interval for each tone). When each tone in the sequence has been detected by the receiving unit, the unit is enabled for communications. For example, N tones may be transmitted, each including one of two phases. Since there are basically no frequency range limitations, the quantity of tone sequences or combinations is abundant. With a radio unit operating in a band of 100–2500 MHz with narrow frequency channels of 1 KHz, the quantity of available channels is $2.4 \times 10^6$, while the quantity of sequences of sixteen (e.g., N=16) tones approaches $2 \times 10^{92}$.

Initiation of communications between transmitting and receiving units may be accomplished in several manners in accordance with the present invention. For example, communications may be initiated by a receiving unit in response to a single tone (e.g., with the consequent loss of reliability), plural serial tones and/or plural parallel tones. The tone transmission may be accomplished at high Signal to Noise Ratio (SNR) (e.g., SNR>10 dB) and at Low to Very Low SNR (e.g., SNR<10 dB and SNR<0 dB, respectively). A conventional phase locked loop employed as an FM demodulator may be used in high SNR conditions, while the loop filter described above is preferably used for low and very low SNR conditions. The loop filter, simultaneously tracking both phase and the rate of change of phase (frequency), is directly applicable to moving platforms, which imprint a doppler rate and doppler rate of change to a transmitted signal. Once the system is "awake" (e.g., the communications are initiated), normal system (e.g., spread spectrum) processing commences with the inherent security provided by that particular communication system. Thus, one of the solutions provided by the present invention to overcome the aforementioned power consumption problems is to basically employ digital radio principles within a frequency hop type system.

The present invention provides several advantages. In particular, the coded FM signals may be transmitted and reliably received in conditions producing a low signal to noise ratio. Further, the present invention listens to the environment with minimal power consumption since the invention includes a majority of passive devices. This provides substantial power savings for hand-held or portable secure radios, such as spread spectrum type devices.

The above and still further objects, features and advantages of the present invention will become apparent upon consideration of the following detailed description of specific embodiments thereof, particularly when taken in conjunction with the accompanying drawings wherein like reference numerals in the various figures are utilized to designate like components.

DETAILED DESCRIPTION OF THE PREFERRED EMBODIMENTS

Figure 1:
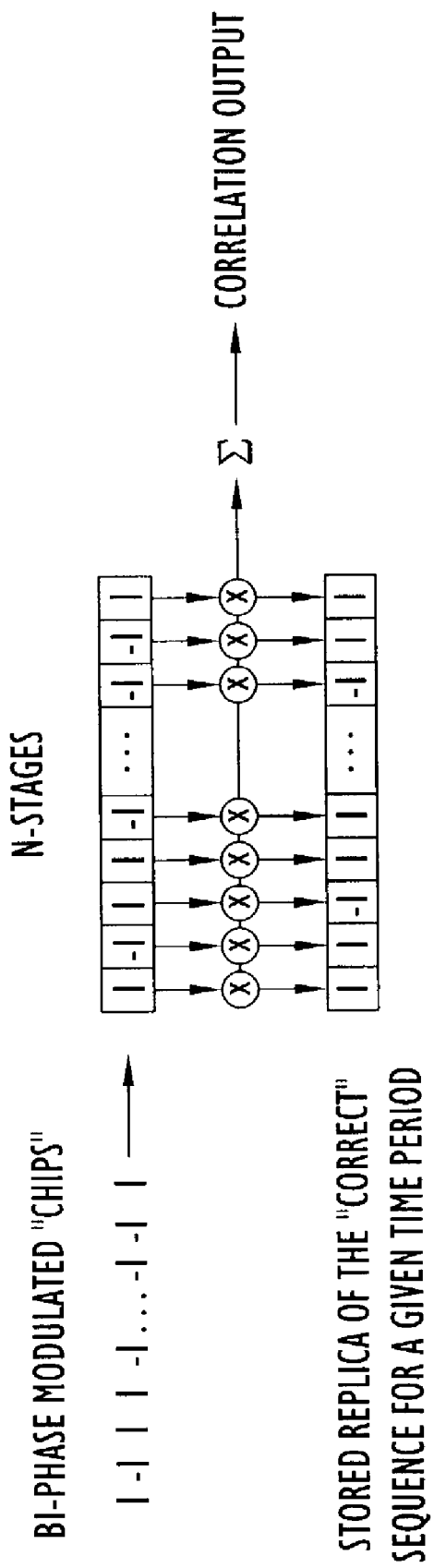
FIG. 1 is a diagrammatic illustration of the operation of a digital matched filter for spread spectrum type radios or communication units.
Figures 2, 3A:
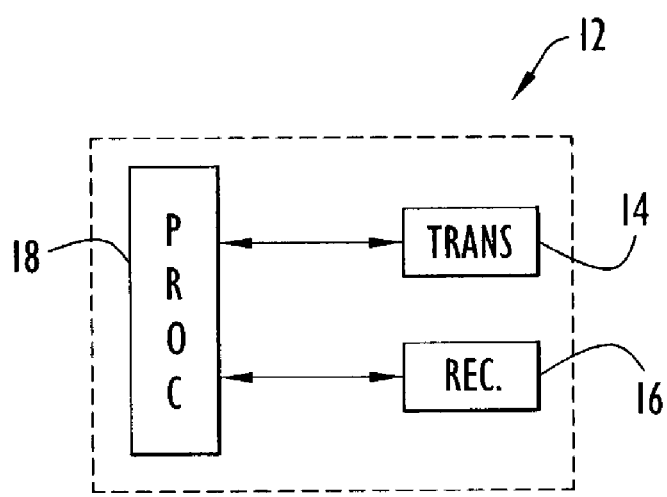
FIG. 2 is a diagrammatic illustration of results produced by a filter of the type of FIG. 1 for exemplary matching and non-matching sequences, where the results for matching sequences are equivalent to the quantity of elements in the sequence and results for non-matching sequences are zero.
FIG. 3A is a block diagram of an exemplary radio or communication unit employing the present invention.

The present invention provides a synchronization scheme for radio communication systems. An exemplary radio or communication unit employing the present invention is illustrated in FIG. 3A. Specifically, unit 12 includes a transmitter 14, a receiver 16 and a processor 18. The processor may be implemented by a conventional processor (e.g., microprocessor or controller) or circuitry and controls the unit (e.g., controls the unit operational modes including at least a transmit mode, a receive mode and a standby or idle mode) to transmit and receive information signals as described below. The transmitter preferably transmits information signals from the processor in the form of radio frequency (RF) signals in accordance with processor instructions. Receiver 16 is configured to receive signals in the form of radio frequency (RF) signals transmitted by the transmitter of another unit. The receiver receives transmitted signals and forwards the received signals to processor 18 for processing as described below. The transmitter and receiver may be implemented by conventional components, such as those employed in standard radio or communication units.

In order to enhance security and reliability within radio communication systems, unit 12 may transmit and receive encoded signals, such as spread spectrum signals. However, the processing required by the individual communication units to employ encoded signals significantly increases unit power consumption. For example, a Direct Sequence Spread Spectrum radio or communication unit basically spreads or expands the bandwidth of a baseband signal via pseudonoise codes that include a greater frequency rate than the baseband rate. The codes are modulated onto the baseband signal and the resulting signal is mixed with an RF carrier signal for transmission. A receiving unit matches the transmitted codes to stored replicas via digital matched filters. These filters must sample the environment and perform filtering at the higher code rate, even during periods of silence or low transmission rates, thereby significantly increasing unit power consumption during reception as described above.

A Frequency Hop Spread Spectrum radio or communication unit shifts the baseband signal in frequency based on a spreading or pseudonoise code to spread the signal over a wider bandwidth. The frequency order is derived from the code, while the shifting or hopping rate is a function of the data or information rate. In order to acquire the signal, a receiving unit is typically required to shift or hop frequencies at a compatible rate in accordance with the spreading code, thereby consuming increased quantities of power during reception as described above. A Hybrid Spread Spectrum radio or communication unit typically employs a combination of direct sequence and frequency hopping techniques and thereby experiences a compounded problem. Since the above techniques require high power consumption by a receiving unit, these techniques are not economical or feasible for small battery operated devices including limited power resources.

Accordingly, the present invention utilizes passive devices to receive a coded frequency modulated (FM)

wakeup or synchronization signal in the form of a sequence of tones that directs circuits within a communication unit to start detecting a transmitted information signal. In other words, the synchronization signal activates or triggers the unit from a standby mode to initiate communications. For example, with respect to spread spectrum systems, the synchronization signal may initiate detection of the pseudonoise codes and/or frequency hopping in accordance with those codes to acquire the transmitted information signal. The present invention listens to the environment with minimal power, thereby significantly reducing power consumption for hand-held or portable radios or communication units. In addition, the present invention may be used in any system that requires low power standby mode. For example, applications of the present invention may include various ranges of standby systems, including a car keyless entry or remote alarm system, alarm systems not directly connected to an alternate current source, etc.

One of the primary reasons for the power savings produced by the present invention is the realization of the wakeup or synchronization circuit (FIG. 3C) with analog components. For example, power consumption by a typical 128 point digital correlator is on the order of 1 Watt (0.932 Watts), while a simple phase locked loop circuit (e.g., first order loop) consumes 0.050 Watts, thereby producing a power ratio of 20:1. Although the realization of the second order loop filter of the present invention (FIGS. 3C and 5), simultaneously tracking phase and frequency, increases the power consumption in an analog implementation to approximately 0.200 Watts, the filter still yields a power ratio of 5:1. Further, the components (e.g., multipliers as well as adders) of a digital correlator are typically enabled all the time. In an analog implementation, the components are similarly enabled; however, the components are composed of basic electrical elements (e.g., resistors, inductors, capacitors, etc.) that inherently consume less power than digital switching gates, which are the basic component of digital circuits.

Figure 3B:
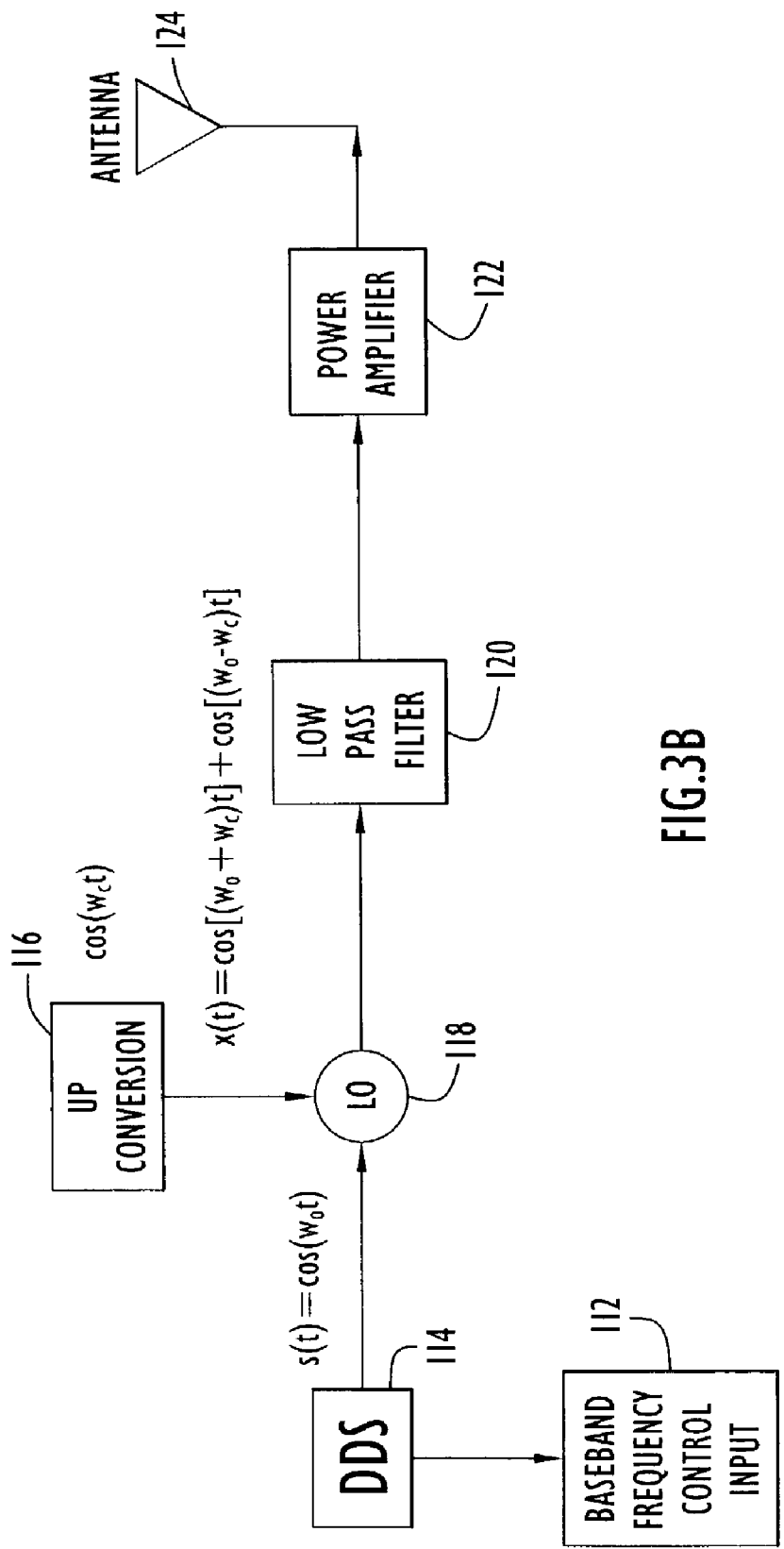
FIG. 3B is a block diagram of a transmitting portion of the communication unit of FIG. 3A including circuitry for generating and transmitting a synchronization signal (e.g., an FM tone sequence) according to the present invention.

A transmission circuit of the present invention for generating the tone sequence to initiate communications is illustrated in FIG. 3B. The transmission circuit basically transmits the tone sequence prior to each communication session with a receiving unit in order to initiate communications with that unit as described below. By way of example only, the transmission circuit is described with respect to an exemplary spread spectrum communication unit (e.g., communication unit 12 of FIG. 3A). However, the transmission circuit operates and may be applied to any radio or communication unit in substantially the same manner described below, but is preferably applied to communication units performing significant processing of communication signals in order to reduce unit power consumption. Specifically, the transmission circuit includes a baseband frequency control input module 112, a direct digital synthesis (DDS) module 114, a local oscillator (LO) 118, an up conversion module 116, a low pass filter 120, a power amplifier 122 and an antenna 124. The baseband frequency control module stores control signals for DDS module 114 to facilitate generation of the appropriate tone signal (e.g., $s(t)=\cos(\omega_o t)$). These control signals are typically in the form of digitally generated samples of the desired output waveform. The frequency control module basically initiates generation of the tone sequence to activate and establish a communication session with a receiving unit in response to control signals from the communication processor (e.g., processor 18 of FIG. 3A).

The DDS module generates a signal of an appropriate frequency in response to the control signals received from frequency control module 112. The tone signal is directed to local oscillator 118 that further receives a carrier signal (e.g., $\cos(\omega_c t)$) from up conversion module 116. The local oscillator basically mixes the tone signal and the carrier signal to produce a frequency modulated tone signal (e.g., $x(t)=\cos[(\omega_o+\omega_c)t]+\cos[(\omega_o-\omega_c)t]$) suitable for transmission. The signal is processed by low pass filter 120 to retrieve desired portions of the signal for transmission. The filtered signal is amplified by power amplifier 122 and radiated into the environment via antenna 124.

Frequency control module 112 enables generation and transmission of the tone for a particular time interval (e.g., provides control signals to the DDS module during the particular time interval) sufficient for a receiving unit to detect that tone as described below. Once the interval expires, the frequency control module provides control signals to DDS module 114 to generate the next tone within the sequence. This process is repeated to transmit each sequence tone. The tone sequence is repeatedly transmitted in this fashion until communications are initiated by a receiving unit or until a communication time interval expires (e.g., time out). Thus, the transmitting unit verifies that the receiving unit has received the tone sequence and entered an active mode from a standby mode via initiation of normal communications with the receiving unit (e.g., standard transmissions or handshaking using the normal (e.g., spread spectrum) waveform). The transmitting unit basically enters an active mode to transmit the tones, thereby enabling handshaking or communications with the receiving unit in response to tone detection. The components of the transmission circuit are typically implemented by conventional components or circuitry, such as those employed in standard radio or communication units. The transmission circuit preferably resides as an external circuit coupled to components of the communication unit transmitter (e.g., transmitter 14 of FIG. 3A); however, the transmission circuit may be disposed at any suitable location and may be integrated within the transmitter.

Alternatively, the transmission circuit may include any quantity of components and be configured to transmit the tone sequence in parallel. For example, DDS module 114 may generate a signal including frequencies of each tone in a sequence in accordance with control signals from frequency control module 112, or the transmission circuit may include plural synthesizers each generating a specific tone signal, where the tone signals may be individually transmitted and/or combined into a synchronization signal for transmission. The tone sequence may include any quantity of tones, while the transmission circuit may be configured in any fashion to transmit the tones in any desired manner (e.g., sequentially, in parallel, etc.).

The tones are narrowband, preferably with a nominal bandwidth of 1 Hz. If the tones are sent in a sequential fashion, the total bandwidth of the wakeup signal is a nominal 1 Hz. When the tones are sent concurrently (e.g., in parallel), the total bandwidth is the separation between the tones. For example, if sixty-four tones are sent centered at 1 GHz (e.g., 32 tones on each side), the total signal bandwidth is 64 Hz. The wakeup or synchronization signal may be transmitted in unused spectrum slots, thereby minimally impacting bandwidth and normal communication unit operation. The Signal to Noise Ratio (SNR) of the tones is similar to those of a Direct Sequence Spread Spectrum (DSSS) signal (e.g., either high above 10 dB or low and very low, below 10 dB and below 0 dB, respectively) with the difference being the power density per Hz of bandwidth. With respect to DSSS, the power is spread over the bandwidth, while the power for the narrow tone is concentrated in the tone spectral line. DSSS bandwidths are typically in the 1 MHz to 32 MHz range.

The time duration of each tone depends on the specific hardware realization of the wakeup or synchronization circuit (FIG. 3C) within the receiving unit described below. The tone duration may be controlled by the baseband frequency control module supplying tone parameters to the DDS module for a certain time interval and subsequently switching parameters to generate the next tone in the sequence at expiration of that interval as described above. The primary parameter is the time for a phase locked loop (PLL) of the receiving unit to lock onto the signal, which for a first order loop is obtained from the integration of the difference signal:

$$\int_0^T \frac{A}{2T} \cdot [\sin[\omega \cdot (t - to)] - \sin(\omega \cdot t)] dt$$

Integrating the above equation yields:

$$\frac{-1}{2} \cdot A \cdot \frac{(\cos(T \cdot \omega) \cdot \cos(\omega \cdot to) + \sin(T \cdot \omega) \cdot \sin(\omega \cdot to) - \cos(T \cdot \omega) - \cos(\omega \cdot to) + 1)}{T \cdot \omega}$$

Simplifying and equating to an exemplary output voltage of five volts (e.g., this depends on the specific system) produces:

$$T := \frac{4A}{2 \cdot \pi \cdot fo} \quad T = 3.183 \times 10^{-6} \text{ s}$$

where A=5V and $f_o$=1 MHz.

Thus, for a signal amplitude of five volts and a baseband frequency, $f_o$, of 1 MHz, the loop locks after 3.183 μsec (e.g., this is after slightly more than three cycles).

Figure 7:
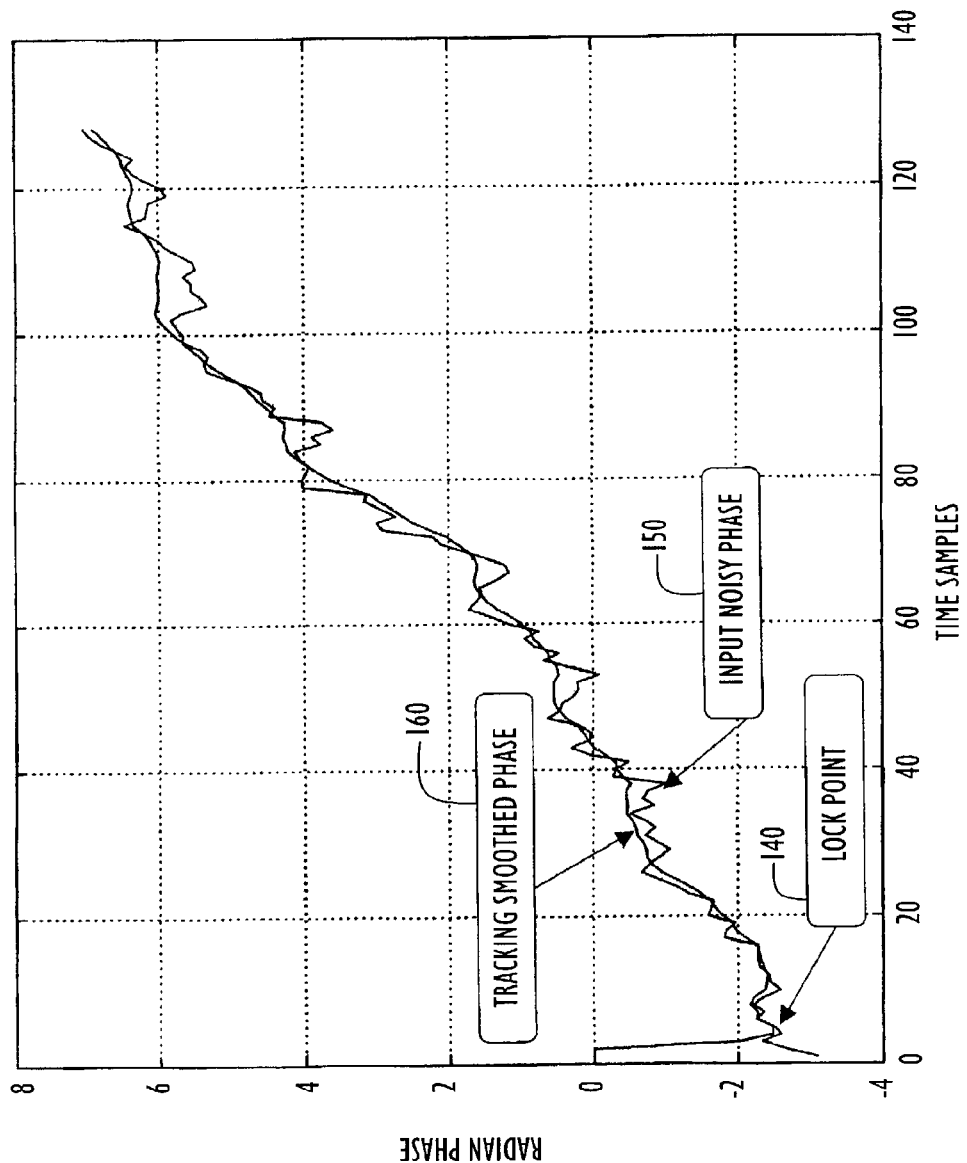
FIG. 7 is a graphical illustration of operation of the wakeup circuit of FIG. 3C performing rapid acquisition and tracking of a noisy multi-frequency input signal.

The double loop filter of the present invention (FIGS. 3C and 5) locks at approximately ten samples as shown in FIG. 7. Thus, for a 1 MHz sampling rate, $f_s$, the time to lock, $T_{lock}$, is $$T_{lock} := \frac{10}{fs} \quad T_{lock} = 1 \times 10^{-5} \text{ s}$$

or 10 μsec. Accordingly, the duration of each tone should exceed the lock time for the particular loop employed in order to enable detection of that tone by the receiving unit.

Figure 3C:
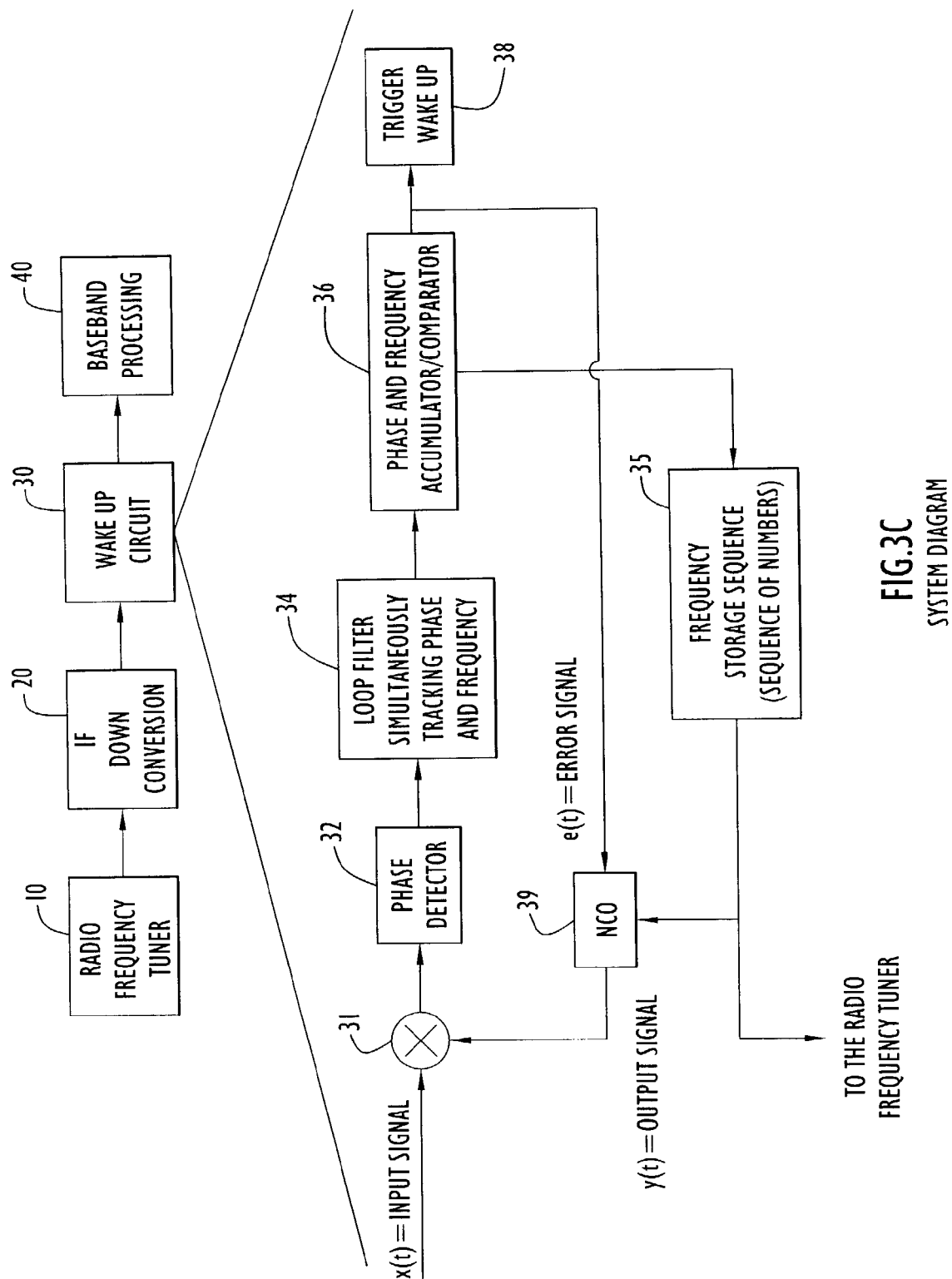
FIG. 3C is a system block diagram of a receiving portion of the communication unit of FIG. 3A including the wakeup circuit of the present invention.

The present invention wakeup or synchronization circuit of the receiving unit is described, by way of example only, with respect to a spread spectrum communication unit. However, the present invention synchronization circuit operates and may be applied to any radio or communication unit (e.g., including a tuner capable of tuning to a wide set of frequencies) in substantially the same manner described below, but is preferably applied to communication units performing significant processing for receiving an incoming signal in order to reduce unit power consumption. The wakeup or synchronization circuit of the present invention within a receiving portion of an exemplary spread spectrum communication unit (e.g., communication unit 12 of FIG. 3A) is illustrated in FIG. 3C. One of the key features of the present invention synchronization circuitry is the use of a digital radio waveform for the synchronization signal and a double loop filter to simultaneously track both frequency and phase as described below. Specifically, the communication unit includes an RF tuner 10, an intermediate frequency (IF) down converter 20, a wakeup or synchronization circuit 30 and a baseband processor 40, typically implemented by processor 18 (FIG. 3A). The tuner controls the unit responsiveness to signals having a certain frequency. An RF signal received by tuner 10 from a unit antenna (not shown) is conveyed to IF down converter 20 to convert the RF signal to an intermediate frequency range. The resulting IF signal is directed to synchronization circuit 30 that employs the synchronization scheme of the present invention to detect coded FM signals and initiate communications (e.g., detection of pseudonoise codes and/or frequency hopping in accordance with those codes) via baseband processor 40. The tuner, down converter and baseband processor are typically implemented by conventional components or circuitry, such as those employed in standard radio or communication units.

Figure 4:
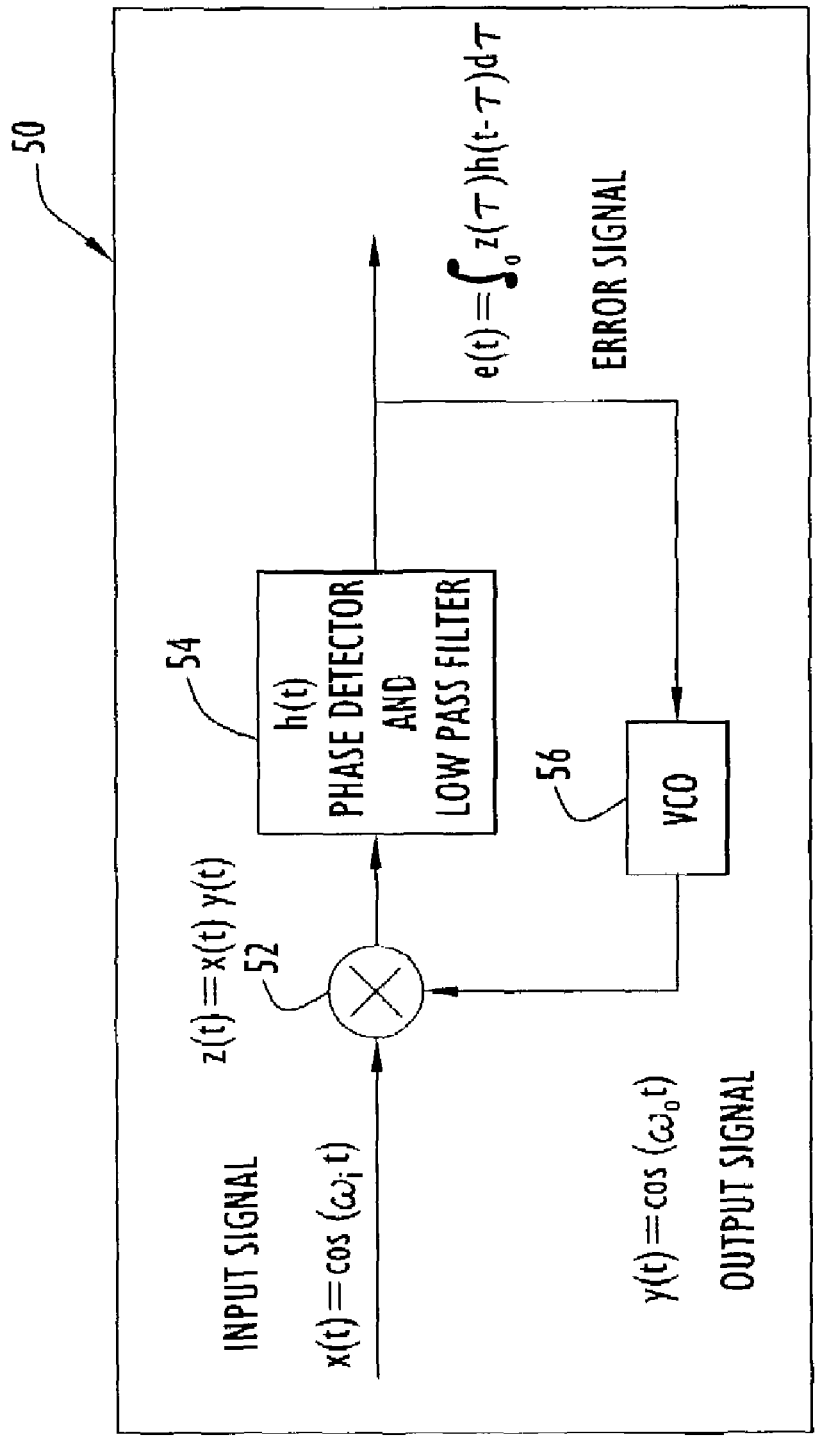
FIG. 4 is a block diagram of a conventional phase locked loop.

Synchronization circuit 30 serves as a type of phase locked loop to lock onto and track incoming signals. A conventional phase locked loop is illustrated, by way of example only, in FIG. 4. Initially, this device basically controls the phase of a frequency modulated oscillator output signal to follow that of an input signal. In particular, phase locked loop 50 includes a mixer 52, a phase detector and low pass filter 54 and a voltage controlled oscillator (VCO) 56. The mixer receives an input signal (e.g., x(t)=cos($\omega_i$t)) and an output signal from the oscillator (e.g., y(t)=cos($\omega_o$t)) and produces a combined output signal (e.g., z(t)=x(t)y(t)). The combined signal is conveyed to phase detector and filter 54. The phase detector compares the frequencies of the input and oscillator signals and produces a phase error signal (e.g., e(t)=$_o{}^t \int z(\tau)h(t-\tau)d\tau$) that is filtered via the low pass filter and indicates a measure of the phase difference. The phase error signal controls the oscillator to adjust the frequency of the output signal (e.g., y(t)=cos($\omega_o$t)) toward that of the input signal. The oscillator locks onto the frequency of the input signal in response to appropriate conditions and maintains a fixed phase relationship with that signal. During lock, the filtered output of the phase detector is typically a direct current (DC) signal, while the control input to the VCO is a measure of the input signal frequency. Thus, the oscillator output is a locally generated signal including the frequency of the input signal, thereby detecting and producing a clean copy of the input signal.

Referring back to FIG. 3C, synchronization circuit 30 is similar in principle to the phase locked loop and includes a mixer 31, a phase detector 32, a loop filter 34, an accumulator/comparator 36, a trigger module 38 and a numerically controlled oscillator (NCO) 39. The synchronization circuit detects the synchronization signal (e.g., sequence of FM tones) and triggers the baseband processor to initiate communications (e.g., processing of pseudonoise codes and/or frequency hopping in accordance with those codes) in response to detection of the tone sequence as described above. The tone sequence frequencies are stored in a storage unit 35. An initial tone frequency, $f_o$, is retrieved from the storage unit and provided to tuner 10 for reception of particular signals and to oscillator 39 to produce an output signal (e.g., y(t)).

Tuner 10 listens to the particular frequency provided from the storage unit (e.g., the tuner is not able to detect any other frequency at a particular time). The different frequencies composing the total waveform (e.g., synchronization signal) must be sufficiently separated in frequency such that the frequencies cannot lie within the capture range of the loop. This frequency range is given by the loop sensitivity, which is obtained from the loop characteristics. For example, a loop sensitivity of 2 volts/rad, a phase detector sensitivity of $4\pi 10^4$ rad/sec/volt and a VCO signal of 1 KHz produce a synchronization range between 980 and 1020 Hz (i.e., a range of 40 Hz). In this case, the different frequencies have to be separated by more than 40 Hz.

Mixer 31 receives an input signal (e.g., x(t)) from IF down converter 20 and the oscillator output signal and produces a combined output signal. This signal is conveyed to phase detector 32 that compares the frequencies of the signals and produces a phase signal, $\omega_n$, for processing by loop filter 34. The loop filter estimates a fine phase and frequency of the input signal, thereby tracking the input signal in both phase and frequency. The loop filter output is received by accumulator 36 that determines the presence of a consistent loop filter output for a particular time interval, thereby indicating detection of the sequence tone. The tones are not limited to any specific time requirement for detection (e.g., generally detection may occur at any time interval between the lock time of the loop and duration of the tone). The accumulator produces an error signal (e.g., e(t)) to control the frequency of the signal generated by oscillator 39 toward that of the input signal. Thus, synchronization circuit 30 may lock onto the input signal in a manner similar in principle to that of the phase locked loop.

In response to tone detection, the accumulator controls the storage unit to provide the next tone frequency within the sequence to oscillator 39 and tuner 10 to initiate detection of the next tone. The accumulator further determines when each tone within a sequence has been detected, and generates a signal for transmission to wake-up module 38. This module basically initiates baseband processor 40 to switch the communication unit from a standby mode to a receive mode to receive incoming signals (e.g., detect pseudonoise codes and/or frequency hop in accordance with those codes). When no tone with the anticipated frequency is sent by a transmitting unit, the synchronization circuit does not lock on any specific phase and oscillates through the bandwidth established by the loop filter. This condition is detected by the accumulator and does not result in declaration of a lock or detection. The circuit components are typically implemented by conventional components or circuitry, and may further be implemented in the form of integrated circuits. The wakeup or synchronization circuit preferably resides as an external circuit coupled to components of the communication unit receiver (e.g., receiver 16 of FIG. 3A); however, the circuit may be disposed at any suitable location and may be integrated within the receiver.

The synchronization circuit may alternatively include any quantity of components (e.g., plural tuners to detect any frequency in a set at any given time, plural filters, etc.) and be configured to detect parallel transmission of the tones in a sequence. For example, a combined signal including several tones may be processed in a manner similar to that described above to extract and detect the presence of the sequence in the signal. Alternatively, the circuit may include plural components each detecting the presence of a particular tone within the sequence in the manner described above. The synchronization circuit may detect the tone sequence including any quantity of tones and transmitted in any fashion (e.g., sequentially, in parallel, etc.).

Figure 5:
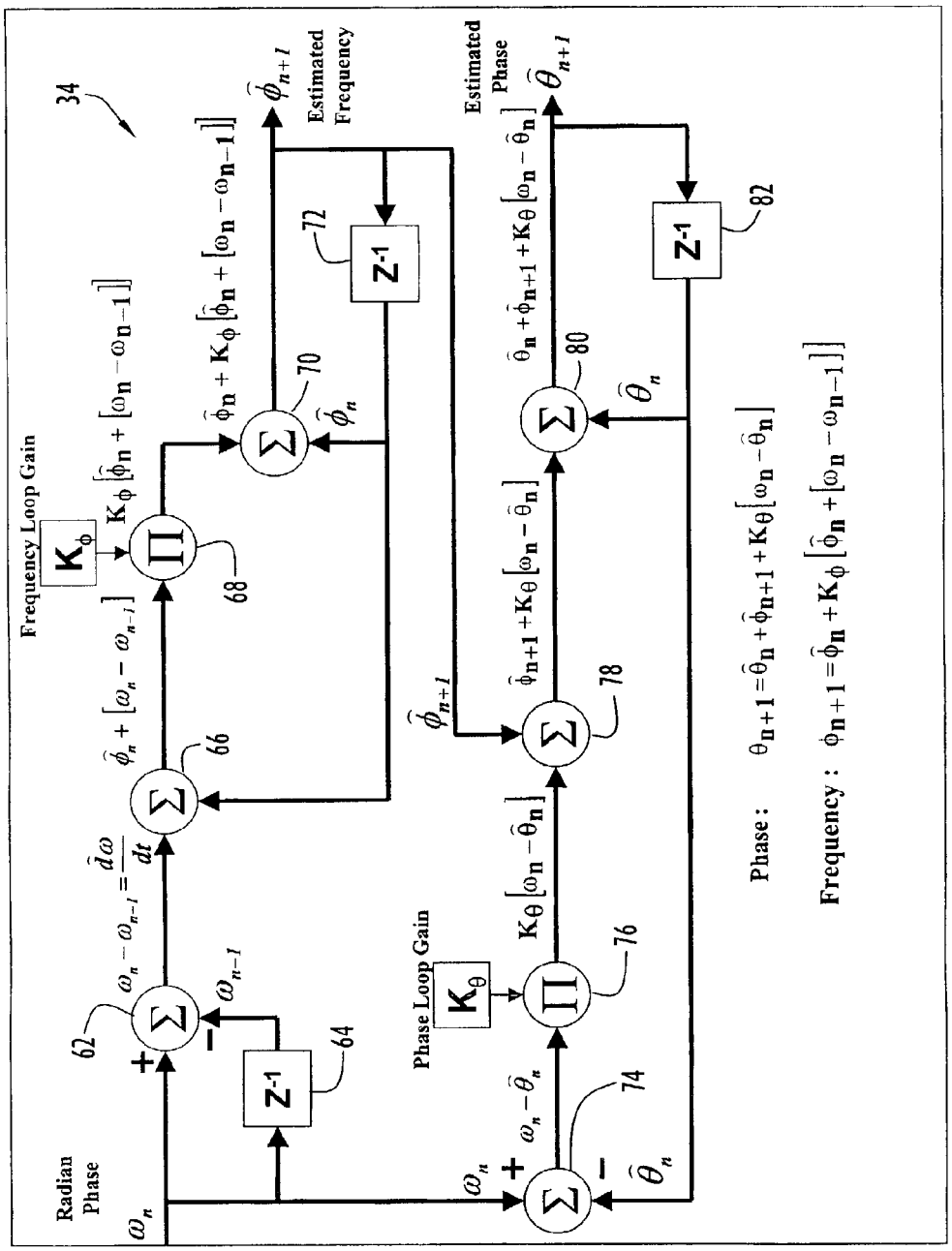
FIG. 5 is a functional diagram of the loop filter of the unit wakeup circuit of FIG. 3C.

The loop filter tracks the phase and frequency of the incoming signal as illustrated in FIG. 5. Initially, the loop filter characteristics are defined by the following recursive equations.

Phase: $\theta_{n+1}=\hat{\theta}_n+\hat{\phi}_{n+1}+K_\theta[\omega_n-\hat{\theta}_n]$ Frequency: $\phi_{n+1}=\hat{\phi}_n+K_\phi[\hat{\phi}_n+[\omega_n-\omega_{n-1}]]$ where $\theta$ represents the estimated phase, $\phi$ represents the estimated frequency, $\omega_n$ represents the phase signal from the phase detector and $K_\phi$ and $K_\theta$ represent loop gain constants. The equations are stated in terms of digital inputs; however, the filter may be implemented in and applied to digital and/or analog components or systems. Specifically, the filter includes a plurality of summers or summing elements 62, 66, 70, 74, 78, 80, multipliers or gain elements 68, 76 and delay elements 64, 72, 82. These components are typically implemented by conventional components. The phase signal, $\omega_n$, from the phase detector is initially delayed by a time interval via delay element 64 and provided to summer 62. The summer further receives the non-delayed phase signal to produce a difference between the current and previous phase signals (e.g., $\omega_n-\omega_{n-1}=d\omega/dt$). The difference is applied to summer 66 that is further coupled to the output of delay element 72 to receive the frequency estimate delayed by a particular time interval (e.g., $\hat{\phi}_n$). Summer 66 produces a summed output of these signals (e.g., $\hat{\phi}_n+[\omega_n-\omega_{n-1}]$) that is directed toward an input of multiplier or gain element 68. The multiplier applies a constant $K_\phi$, representing the frequency loop gain, to the summed signals to produce a product output (e.g., $K_\phi[\hat{\phi}_n+[\omega_n-\omega_{n-1}]]$). The product output is applied to summer 70 along with the delayed output frequency estimate from delay element 72 to produce the estimated frequency $\phi_{n+1}$ (e.g., $\phi_{n+1}=\hat{\phi}_n+K_\phi[\hat{\phi}_n+[\omega_n-\omega_{n-1}]]$) as described above. This portion of the filter basically estimates the frequency by phase differentiation.

In order to produce an estimated phase, the phase signal, $\omega_n$, from the phase detector is further applied to summer 74. The summer is further coupled to the output of delay element 82 that delays the estimated phase by a particular time interval (e.g., $\hat{\theta}_n$). The summer combines these signals (e.g., $\omega_n-\hat{\theta}_n$) and applies the result to multiplier or gain element 76. The multiplier applies a constant $K_\theta$, representing the phase loop gain, to the sum to produce a product output (e.g., $K_\theta[\omega_n-\hat{\theta}_n]$). This product output is applied to summer 78 that is coupled to summer 70 and receives the estimated frequency (e.g., $\hat{\phi}_{n-1}$) The sum of these signals (e.g., $\hat{\phi}_{n+1}+K_\theta[\omega_n-\hat{\theta}_n]$) is applied to summer 80 that is coupled to the output of delay element 82 and receives the delayed phase estimate (e.g., $\hat{\theta}_n$). Summer 80 combines the signals to produce the estimated phase $\theta_{n+1}$ (e.g., $\theta_{n+1}=\hat{\theta}_n+\hat{\phi}_{n+1}+K_\theta[\omega_n-\hat{\theta}_n]$) as described above. This portion of the filter basically determines the phase estimate by a smoothing function.

The loop constants $K_\theta$ and $K_\phi$ are determined by the transfer functions of the filter and through simulations. In the example of FIG. 7, $K_\phi=0.65$ and $K_\theta=0.35$. The constants must have a value between zero and one (e.g., $0<K_{\phi,\theta}<1$). Specifically, applying the Z-Transform, which is the digital equivalent of the Laplace transform for analog systems, to the above digital loop equations yields:

$$H_\theta := \frac{K_\theta}{(Z-1+K_\theta)} \quad H_\phi := \frac{K_\phi}{(Z-1+K_\phi)}$$

which is stable if the poles (i.e., the zeros in the denominator) lie in the unit circle. In order to achieve this, the following conditions need to be satisfied:

$$Z:-1-K_\theta \text{ and } Z:=1-K_\phi$$

Thus, for Z to be less than 1, $K_\phi$ and $K_\theta$ must each be less than 1.

A first order loop can track step changes in the rate of change of phase (which is frequency), while a second order loop can track ramp or continuous changes in the rate of change of phase. First and second order loops can be made unconditionally stable (which is not true for higher order loops). The loop of FIG. 5 can track a rate of change of frequency, and is thereby applicable to moving platforms.

A conventional PLL may alternatively be employed by the present invention to decode the synchronization signal at high SNR (i.e., SNR>10 dB), while the double loop filter described above can be used to track moving platforms and signals at low and very low SNR (i.e., SNR<10 dB and SNR<0 dB, respectively). This is due to the double loop tracking both the phase and the rate of change of phase (sample by sample), and being based on a moving average principle. To this extent, this loop can be construed as an Autoregressive Moving Average (ARMA) system.

Figure 6:
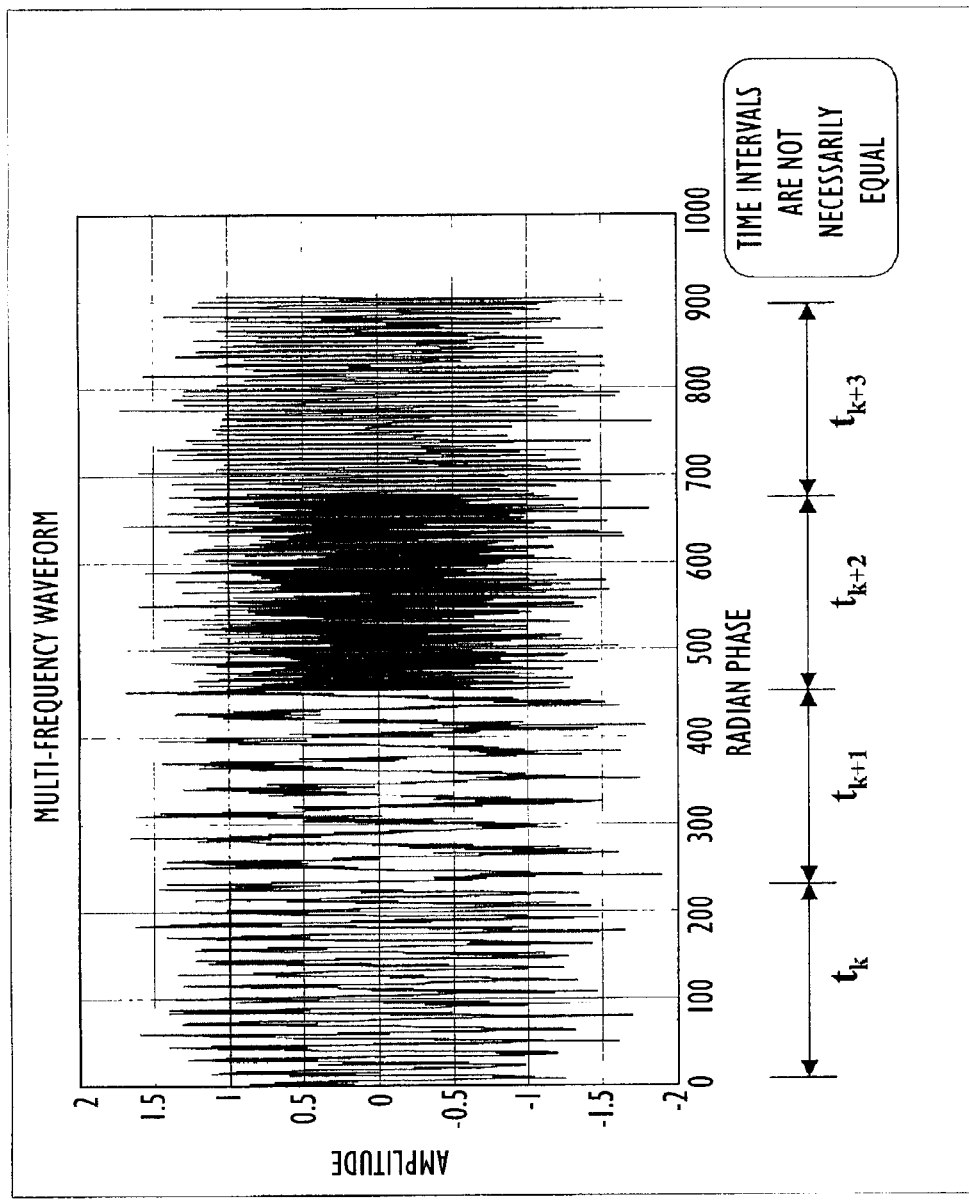
FIG. 6 is a graphical illustration of a time-domain structure of a multi-frequency waveform.

The synchronization or wakeup circuit receives and processes the input signal, preferably during the standby mode of the communication unit, in order to detect the presence of a tone sequence. The detection is achieved by locking onto the input signal as described above. An exemplary multi-frequency waveform processed by the synchronization circuit is graphically illustrated with reference to the time domain in FIG. 6. The time intervals for the various frequencies of the signal may vary in any fashion. The loop filter tracks the phase and frequency of the input signal to control oscillator 39 to follow the input signal. An exemplary graphical illustration of the synchronization circuit tracking an input signal is illustrated in FIG. 7. Initially, an input signal 150 contains the desired tone and noise. The loop filter tracks the phase and frequency, thereby rapidly achieving lock at 140. The filter tracks and smoothes the input signal to enable the oscillator to produce a smoothed signal 160 and to enable the circuit to indicate detection.

Figure 8:
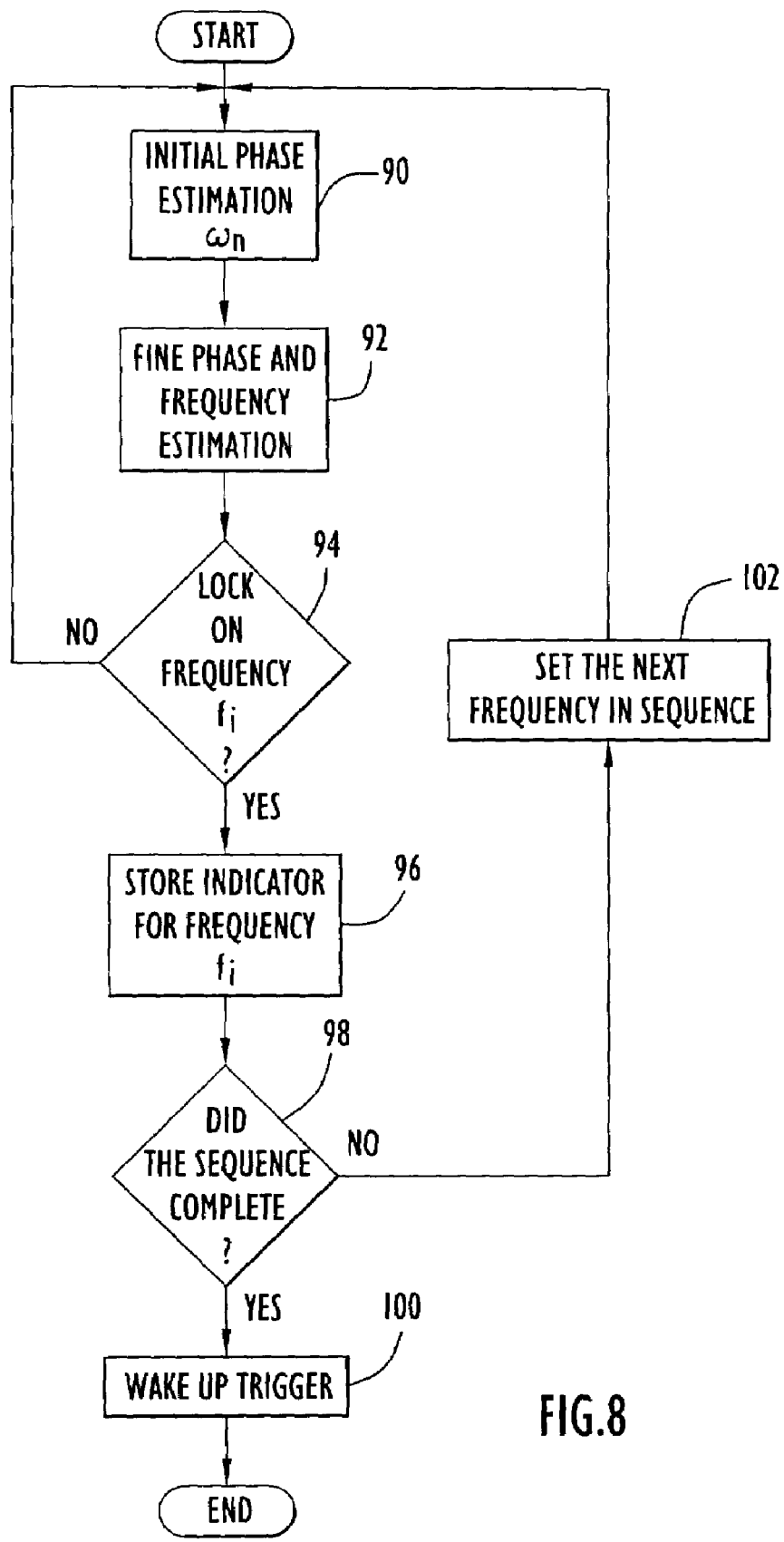
FIG. 8 is procedural flow chart illustrating the manner in which a receiving communication unit detects the synchronization signal to enable communications according to the present invention.

The manner in which the present invention performs synchronization to initiate communications is illustrated in FIG. 8. By way of example only, the present invention synchronization is described with reference to exemplary spread spectrum communication units (e.g., communication unit 12 and corresponding components described above for FIGS. 3A–3C). Initially, a transmitting unit transmits a tone sequence to initiate communications as described above for FIG. 3B. The receiving unit detects the tone sequence in order to enter an active mode for communications from a standby mode. In particular, the receiving unit selects an initial tone frequency, $f_o$, within the tone sequence being transmitted, typically including a series of different frequencies, $f_o \ldots f_n$. The particular tone sequence employed is pre-arranged between the transmitting and receiving units. Oscillator 39 and tuner 10 of the receiving unit are tuned to the initial frequency via information from storage unit 35 as described above. The oscillator signal and input signal (e.g., received by the receiving unit antenna) are combined as described above and applied to the phase detector to determine an initial phase estimation, $\omega_n$, at step 90. The loop filter receives the initial phase estimation from the phase detector and estimates a fine phase and frequency of the input signal at step 92 to facilitate tone detection and control oscillator 39 as described above. When a tone within the sequence (e.g., including frequency, $f_i$, where $0 \leq i \leq n$) is being received, the synchronization circuit starts to lock in a manner similar in principle to a phase locked loop. The filter produces a consistent output for a predetermined time interval that is detected by the accumulator, thereby indicating detection or a lock. No specific time interval is required for declaring a detection of each tone. In other words, the circuit may determine detection of each tone within any desired time interval (e.g., generally any interval between the lock time of the loop and duration of the tone). When no tone is received, the circuit does not lock on any specific phase and oscillates through the values permitted by the loop filter bandwidth as described above. Thus, when the circuit does not lock onto the input signal as determined at step 94, the initial phase, fine phase and frequency estimations are performed to cycle through the values.

If a lock is detected at step 94 by the accumulator, a detection is declared and an indicator indicating detection of the tone is stored by the accumulator at step 96. The accumulator determines, based on stored indicators, whether or not the complete tone sequence has been detected at step 98. When each tone in the sequence has not been received, the circuit is set to detect the next tone in the sequence at step 102. This is typically accomplished by the accumulator controlling the storage unit to provide the next tone frequency information to the oscillator and tuner as described above. The circuit detects transmission of succeeding tones in substantially the same manner described above. When prior tones are still resident in the environment during detection of a succeeding tone, the circuit loses lock on the prior tone and establishes lock on the succeeding tone in response to transmission of the succeeding tone and the frequency information for that succeeding tone provided by the storage unit as described above.

When each tone has been received in the appropriate order as determined by the accumulator at step 98, a signal is transmitted to the wakeup module to trigger the baseband processor to switch the unit from a standby mode into a receive mode and initiate communications at step 100. The unit subsequently begins detection and processing of incoming information signals (e.g., detection of pseudonoise codes and/or frequency hopping in accordance with those codes) as described above. The transmitting unit detects initiation of communications by the receiving unit (e.g., via reception of signals and/or handshaking) and commences to transmit information (e.g., spread spectrum) signals to that unit. The present invention utilizes the sequence of tone frequencies for synchronization, where the tones are transmitted and received in the exact predetermined sequence to initiate communications. The present invention synchronization may utilize signaling that differs from or is the same as the unit signaling for information signals, where the synchronization signals or tones may include any desired information (e.g., other than synchronization information).

When the tone sequence is transmitted concurrently or in parallel, the process may be modified to detect the presence of each sequence tone in a received signal. For example, the tones may be extracted from a received signal and processed sequentially or in parallel in a manner similar to that described above to detect the tone sequence. Alternatively, individual tones may be received and processed in parallel in a manner similar to that described above, where the individual tone detentions may be combined to determine reception of the sequence. It will be appreciated that the embodiments described above and illustrated in the drawings represent only a few of the many ways of implementing a method and apparatus for securely enabling a radio communication unit from standby mode.

A communication system employing the present invention may include any quantity of communication units. The units may communicate via any suitable communications medium (e.g., wireless communication medium, etc.). The communication unit may include any quantity of any conventional or other components (e.g., transmitter, receiver, processor, etc.), where each transmitter may transmit signals at any suitable frequency and in any suitable energy form (e.g., radio signals, microwave, optical signals, etc.) and each receiver may receive signals at any suitable frequency and in any suitable energy form (e.g., radio signals, microwave, optical signals, etc.). Alternatively, the communication unit may include any quantity of combined transmitting/receiving devices. The communication unit may include any quantity of any types of modes (e.g., transmit, receive, standby, etc.) and may detect the synchronization signal and/or be triggered to enter a receive mode from any desired mode.

The processor of the communication unit may be implemented by any conventional or other microprocessor, controller or circuitry to perform the functions described herein, while any quantity of processors or processing devices or circuitry may be employed within the communication unit, where the processor functions may be distributed in any fashion among any quantity of modules, processors or other processing devices or circuits.

The synchronization or wakeup signal may include any quantity of tones or other signals of any energy form, frequency or band, and/or modulated (e.g., frequency modulated, etc.), encoded and/or arranged in any desired order or fashion. The tones may be separated in frequency by any suitable offset outside the capture range of the loop. The tones or signals may be transmitted in any desired order or fashion (e.g., sequentially, in parallel, interleaved with another signal, any combination of these, etc.). The synchronization signal may include any quantity of sequences to trigger a receiving unit, where each sequence may include any quantity of tones or other signals arranged in any fashion.

The transmission circuit components (e.g., frequency control input module, up conversion module, local oscillator, low pass filter, amplifier, DDS, antenna, etc.) may be implemented by any quantity of any conventional or other components performing the functions described herein. These components may be implemented by any processors and/or circuitry. The filter may be implemented by any type of filter to extract a desired frequency portion (e.g., high pass, low pass, band pass, etc.). The circuit may generate and transmit any type of synchronization signal (e.g., tones, encoded signals, modulated signals, etc.). The tones may be transmitted in any order or fashion (e.g., sequentially, in parallel, any combination thereof, etc.). The DDS may be implemented by any type of oscillator or synthesizer to generate an appropriate signal (e.g., of a particular frequency, etc.) based on control signals. The frequency control input module may provide any types of control signals to the DDS or other synthesizer to generate the appropriate signals. The carrier signal provided by the up conversion module may be of any desired frequency or energy form suitable for transmission. The amplifier may include any desired gain to amplify the signal, while the antenna may include any desired configuration to emit the signal. The tones may include any desired duration, where the duration may be controlled by any transmission circuit component or an external processor or circuit.

The transmission circuit may be configured to transmit the tone sequence in parallel. For example, the DDS module may generate a signal including frequencies of each tone in a sequence in accordance with control signals from the frequency control module, or the transmission circuit may include plural synthesizers each generating a specific tone signal, where the tone signals may be individually transmitted and/or combined into a synchronization signal for transmission. A communication unit may include any quantity of transmission circuits to transmit any quantity of synchronization signals, while the transmission circuit may be configured in any fashion to transmit the tones and/or sequences in any desired order or manner (e.g., sequentially, in parallel, etc.). The transmission circuit preferably resides as an external circuit coupled to components of the communication unit; however, the transmission circuit may be disposed at any suitable location and may be integrated with any desired components (e.g., transmitter, etc.).

The communication unit receiving portion components (e.g., tuner, down conversion, processor, etc.) may be implemented by any quantity of any conventional or other components performing the functions described herein. These components may be implemented by any processors and/or circuitry. The tuner may be responsive to any desired frequency or frequency range to receive any desired signal or quantity of signals (e.g., tones or tone sequences).

The wakeup or synchronization circuit components (e.g., mixer, phase detector, loop filter, accumulator, trigger module, oscillator, storage unit, etc.) may similarly be implemented by any quantity of any conventional or other components performing the functions described herein. These components may be implemented by any processors and/or circuitry. The circuit may detect any type of synchronization signal (e.g., tones, encoded signals, modulated signals, any energy form, etc.) transmitted in any order or fashion (e.g., sequentially, in parallel, any combination thereof, etc.). The accumulator may detect the filter output for any desired time interval in order to declare a detection or lock. The storage unit may be implemented by any conventional or other storage device and include information to generate signals of any desired frequency. The oscillator may be implemented by any conventional or other oscillator to generate any type of signal based on any type of control and/or frequency information. A communication unit may include any quantity of receiving portion and/or synchronization circuits to receive any quantity of synchronization signals, while the receiving portion and/or synchronization circuits may be configured in any fashion to receive the tones and/or sequences in any desired order or manner (e.g., sequentially, in parallel, etc.). The synchronization circuit preferably resides as an external circuit coupled to components of the communication unit; however, the synchronization circuit may be disposed at any suitable location and may be integrated with any desired components (e.g., receiver, etc.).

The synchronization circuit may utilize a conventional PLL for high SNR conditions, and may employ the double loop filter at any desired conditions, but preferably at low and very low SNR conditions. The synchronization circuit may include various configurations to detect various synchronization signals transmitted in any order or fashion. For example, the circuit may employ a single conventional PLL with a single tone utilized as the synchronization signal. Detection of the tone by the receiving unit basically initiates communications in a manner similar to that described above. In this case, the synchronization circuit includes a conventional PLL (e.g., FIG. 4), preferably in integrated circuit form, coupled to an amplitude detector to determine when a particular threshold is exceeded (e.g., indicating reception of the wakeup signal or tone). The amplitude detector is coupled to a trigger circuit to enable the communication unit.

Alternatively, the synchronization circuit may include a double loop PLL (e.g., tracking phase and frequency) utilizing a single tone as the synchronization signal to track moving platforms at low SNR. This type of circuit includes the double loop PLL coupled to an amplitude detector to determine reception of the tone, where the detector is further coupled to a trigger circuit to enable the communication unit.

Yet another configuration of the synchronization circuit may include a single conventional PLL utilizing plural tones as the synchronization signal. This configuration includes the PLL coupled to an amplitude detector that is further coupled to accumulators (e.g., capacitors) which detect the reception of each tone. In this case, reception of each tone indicates reception of the synchronization signal, while the particular sequence in which the tones are sent is irrelevant.

Still another configuration of the synchronization circuit to track moving platforms at low SNR may include the double loop PLL utilizing plural tones as the synchronization signal. This configuration includes the double loop PLL coupled to an amplitude detector that is further coupled to accumulators (e.g., capacitors) which detect the reception of each tone. In this case, reception of each tone indicates reception of the synchronization signal, while the particular sequence in which the tones are sent is irrelevant.

A further configuration of the configuration circuit may include plural conventional PLLs each detecting a particular tone within a plural tone wakeup or synchronization signal and coupled to an amplitude detector to determine when a particular threshold is exceeded (e.g., indicating reception of the particular tone). The amplitude detectors are coupled to an accumulation and summing circuit (e.g., capacitors) as described above to detect the reception of each tone, which is coupled to a trigger circuit to initiate communications.

Yet another configuration for the synchronization circuit to track moving platforms at low SNR includes plural double loop PLLs each detecting a particular tone within a plural tone wakeup signal and coupled to an amplitude detector to determine reception of the particular tone. The amplitude detectors are coupled to an accumulation and summing circuit (e.g., capacitors) as described above to detect the reception of each tone, which is coupled to a trigger circuit to initiate communications.

The loop filter components may be implemented by any quantity of any conventional or other components (e.g., summers, multipliers, delay elements, etc.) arranged in any fashion to produce the desired outputs in accordance with the filter equations. The filter may be implemented by any processors or circuitry in digital and/or analog form. The constants may have any desired values between zero and one, and may further include values outside this range depending upon a desired filter stability. The loop filter may further include any desired quantity of loops to track the phase, frequency and/or any other characteristics of a signal. The loop filter may be utilized for any desired SNR conditions (e.g., high, low, very low, etc.), but is preferably utilized for low and very low SNR conditions. The loop filter equations may be modified in any desired fashion that enables tracking of phase and frequency as described above.

The software for the processors of the communication unit and corresponding circuitry may be implemented in any suitable computer language, and could be developed by one of ordinary skill in the computer and/or programming arts based on the functional description contained herein and the flow chart illustrated in the drawings. The techniques described above and illustrated in the flow chart may be modified in any manner that accomplishes the functions described herein.

The various variables used herein (e.g., "i", "n", "N", etc.) are typically in the form of integers, but may be in any desired form and have any desired values to represent the varying characteristics of the present invention (e.g., quantity of tones, stages, frequencies, etc.). The present invention synchronization may utilize signaling that differs from or is the same as the unit signaling for information signals, where the synchronization signals or tones may include any desired information (e.g., other than synchronization information). Each tone within a sequence may be transmitted and/or received in any desired order to initiate communications (e.g., no order (e.g., reception of the whole or any desired portion of the sequence in any order), exact order (e.g., reception of the whole or any desired portion of the sequence in the exact order), every nth tone received is in the sequence, any desired portion of the sequence received in any order, etc.).

It is to be understood that the present invention is not limited to the applications described herein, but may be utilized for various communication applications, especially those employing significant processing for received signals (e.g., encoded signals, spread spectrum, etc.). Further, the present invention may be used in any system that requires low power standby mode. For example, applications of the present invention may include various ranges of standby systems, including a car keyless entry or remote alarm system, alarm systems not directly connected to an alternate current source, etc. Moreover, the present invention may be implemented in or applied to various portable or other communication devices (e.g., telephones, radios, computers, etc.), especially those utilizing batteries or other limited power resources, to reduce device power consumption.

From the foregoing description, it will be appreciated that the invention makes available a novel method and apparatus for securely enabling a radio communication unit from standby mode, wherein a synchronization signal in the form of a sequence of FM tones is transmitted to enable a receiving unit to initiate communications, thereby reducing receiving unit power consumption.

Having described preferred embodiments of a new and improved method and apparatus for securely enabling a radio communication unit from standby mode, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. In a communications system, a communication unit to transmit and receive information signals within said system comprising:
   a transmission section to transmit an information signal in the form of radio signals to at least one other communication unit within said system;
   a receiving section to receive said information signal in the form of radio signals from at least one other communication unit within said system; and
   a processor to control communication unit operation to transmit said information signal and receive incoming signals to determine the presence of and process said information signal;

wherein said receiving section includes a synchronization circuit to detect a pre-arranged synchronization signal transmitted by said other unit and trigger said processor to initiate reception of an incoming information signal from that other unit in response to said detection, said synchronization signal being transmitted by said other unit independently of said information signal and including a sequence of at least one frequency signal with each frequency signal of a particular corresponding frequency;

wherein said information signal is generated and transmitted in accordance with a first scheme, and said at least one frequency signal is generated and transmitted in accordance with a second different scheme.

2. The unit of claim 1, wherein said first scheme includes an encoding scheme, and said second scheme includes frequency modulation.

3. The unit of claim 2, wherein said first scheme includes generating and transmitting said information signal in the form of a spread spectrum signal.

4. The unit of claim 1, wherein said transmission section includes a transmission circuit to generate and transmit said synchronization signal, said transmission circuit including:
   a frequency control input module to store control signals facilitating generation of each frequency signal within said sequence;
   a synthesizer to generate each said frequency signal in accordance with said control signals from said frequency control input module;
   an up conversion module to provide a carrier signal for transmission of each said frequency signal;
   an oscillator to mix each frequency signal with said carrier signal and produce a mixed signal;
   a filter to retrieve desired portions from said mixed signal and produce a filtered signal containing said desired portions; and
   an amplifier to amplify said filtered signal and produce an amplified signal for transmission.

5. The unit of claim 1, wherein said synchronization circuit includes a phase locked loop to detect said synchronization signal in conditions where a signal to noise ratio is greater than ten decibels.

6. The unit of claim 1, wherein said synchronization circuit includes a tracking circuit to track phase and frequency of incoming signals to detect the presence of said at least one frequency signal of said sequence.

7. The unit of claim 6, wherein said tracking circuit tracks said incoming signals received from a moving platform.

8. The unit of claim 6, wherein said tracking circuit detects the presence of said at least one frequency signal of said sequence in conditions where a signal to noise ratio is less than ten decibels.

9. The unit of claim 6, wherein said tracking circuit includes a loop filter to track said phase and frequency of said incoming signals in accordance with the following equations:

Frequency: $\phi_{n+1} = \hat{\phi}_n + K_\phi [\hat{\phi}_n + [\omega_n - \omega_{n-1}]]$ Phase: $\theta_{n+1} = \hat{\theta}_n + \hat{\phi}_{n+1} + K_\theta [\omega_n - \hat{\theta}_n]$ where $\theta$ represents the estimated phase, $\phi$ represents the estimated frequency, $\omega_n$ represents a phase signal indicating the phase information of an incoming signal with respect to a reference signal and $K_\phi$ and $K_\theta$ represent loop gain constants.

10. The unit of claim 9, wherein the loop gain constants $K_\phi$ and $K_\theta$ are less than one.

11. The unit of claim 6, wherein said receiving section further includes:
   a tuner to receive incoming signals of a particular frequency in accordance with control signals;
   a down converter module to convert the incoming signal to an intermediate frequency signal that is directed to said synchronization circuit, wherein said synchronization circuit includes:
   said tracking circuit, including:
      an oscillator to generate a reference signal in accordance with control parameters;
      a storage unit to store and provide frequency information relating to each said frequency signal of said sequence to said oscillator and tuner;
      a mixer to mix an incoming signal with said reference signal to produce a mixed signal;
      a phase detector to receive said mixed signal and produce a phase signal indicating phase information of said mixed signal;
      a loop filter to receive said phase signal and produce estimates of phase and frequency; and
      an accumulator to generate control parameters for said oscillator and detect the presence of a frequency signal within said sequence based on said estimates and to determine reception of each frequency signal in said sequence; and
   an activation module to trigger said processor to initiate a communications session in response to said reception of said sequence.

12. The unit of claim 1, wherein:
   said processor controls operational modes of said unit including at least a receive mode, a transmit mode and a standby mode; and
   said synchronization circuit detects said synchronization signal during said standby mode and triggers said processor to switch said unit from said standby mode to said receive mode to receive and process said information signal in response to said detection.

13. In a communications system, a method of transmitting and receiving information signals in the form of radio signals between communication units within said system comprising the steps of:
   (a) detecting a pre-arranged synchronization signal at a receiving unit that is transmitted by a transmitting unit, wherein said synchronization signal is transmitted by said transmitting unit independently of an information signal and includes a sequence of at least one frequency signal with each frequency signal of a particular corresponding frequency, and wherein said information signal is generated and transmitted in accordance with a first scheme, and said at least one frequency signal is generated and transmitted in accordance with a second different scheme; and
   (b) initiating reception of said information signal from the transmitting unit in response to said detection.

14. The method of claim 13, wherein said first scheme includes an encoding scheme, and said second scheme includes frequency modulation.

15. The method of claim 14, wherein said first scheme includes generating and transmitting said information signal in the form of a spread spectrum signal.

16. The method of claim 13, wherein step (a) further includes:
   (a.1) generating and transmitting said synchronization signal at said transmitting unit by:
      (a.1.1) storing control signals facilitating generation of each frequency signal within said sequence;

(a.1.2) generating each said frequency signal in accordance with said control signals;

(a.1.3) providing a carrier signal for transmission of each said frequency signal;

(a.1.4) mixing each frequency signal with said carrier signal and producing a mixed signal;

(a.1.5) retrieving desired portions from said mixed signal and producing a filtered signal containing said desired portions; and (a.1.6) amplifying said filtered signal and producing an amplified signal for transmission.

17. The method of claim 13, wherein said receiving unit includes a synchronization circuit employing a phase locked loop to detect said synchronization signal, and step (a) further includes:

(a.1) detecting said synchronization signal in conditions where a signal to noise ratio is greater than ten decibels.

18. The method of claim 13, wherein said receiving unit includes a synchronization circuit employing a tracking circuit to detect said synchronization signal, and step (a) further includes:

(a.1) detecting said synchronization signal by tracking phase and frequency of incoming signals to detect the presence of said at least one frequency signal of said sequence.

19. The method of claim 18, wherein step (a.1) further includes:

(a.1.1) tracking said incoming signals received from a moving platform.

20. The method of claim 18, wherein step (a.1) further includes:

(a.1.1) detecting said synchronization signal in conditions where a signal to noise ratio is less than ten decibels.

21. The method of claim 18, wherein step (a.1) further includes:

(a.1.1) tracking said phase and frequency of said incoming signals in accordance with the following equations:

Phase: $\theta_{n+1} = \hat{\theta}_n + \hat{\phi}_{n+1} + K_\theta[\omega_n - \hat{\theta}_n]$ Frequency: $\phi_{n+1} = \hat{\phi}_n + K_\phi[\hat{\phi}_n + [\omega_n - \omega_{n-1}]]$ where $\theta$ represents the estimated phase, $\phi$ represents the estimated frequency, $\omega_n$ represents a phase signal indicating the phase information of an incoming signal with respect to a reference signal and $K_\phi$ and $K_\theta$ represent loop gain constants.

22. The method of claim 21, wherein the loop gain constants $K_\phi$ and $K_\theta$ are less than one.

23. The method of claim 13, wherein step (a) further includes:

(a.1) detecting said synchronization signal at said receiving unit by:

(a.1.1) receiving incoming signals of a particular frequency in accordance with control signals;

(a.1.2) converting an incoming signal to an intermediate frequency signal;

(a.1.3) generating a reference signal in accordance with control parameters;

(a.1.4) storing and providing frequency information relating to each said frequency signal of said sequence to receive said incoming signals and generate said reference signal;

(a.1.5) mixing the intermediate frequency signal with said reference signal to produce a mixed signal;

(a.1.6) determining a phase signal indicating phase information of said mixed signal;

(a.1.7) determining estimates of phase and frequency based on said phase signal;

(a.1.8) generating control parameters to generate the reference signal and detecting the presence of a frequency signal within said sequence based on said estimates and determining reception of each frequency signal in said sequence; and (a.1.9) initiating a communications session in response to said reception of said sequence.

24. The method of claim 13, wherein said receiving unit includes operational modes of at least a receive mode, a transmit mode and a standby mode, and step (a) further includes:

(a.1) detecting said synchronization signal during said standby mode; and step (b) further includes:

(b.1) said receiving unit switching from said standby mode to said receive mode to receive and process said information signal in response to said detection.

25. A communications system comprising:

a transmitting unit to transmit an information signal in the form of radio signals and to transmit a pre-arranged synchronization signal independently of said information signal to initiate a communications session, said synchronization signal including a sequence of at least one frequency signal with each frequency signal of a particular corresponding frequency, wherein said information signal is generated and transmitted in accordance with a first scheme, and said at least one frequency signal is generated and transmitted in accordance with a second different scheme; and a receiving unit to receive said information signal in the form of radio signals from said transmitting unit, wherein said receiving unit includes:

a controller to control receiving unit operation to determine the presence of and process said information signal; and a synchronization circuit to detect said synchronization signal transmitted by said transmitting unit and trigger said controller to initiate reception of an incoming information signal from that unit in response to said detection.

26. The system of claim 25, wherein said first scheme includes an encoding scheme, and said second scheme includes frequency modulation.

27. The system of claim 26, wherein said first scheme includes generating and transmitting said information signal in the form of a spread spectrum signal.

28. The system of claim 25, wherein said transmitting unit includes a transmission circuit to generate and transmit said synchronization signal, said transmission circuit including:

a frequency control input module to store control signals facilitating generation of each frequency signal within said sequence;

a synthesizer to generate each said frequency signal in accordance with said control signals from said frequency control input module;

an up conversion module to provide a carrier signal for transmission of each said frequency signal;

an oscillator to mix each frequency signal with said carrier signal and produce a mixed signal;

a filter to retrieve desired portions from said mixed signal and produce a filtered signal containing said desired portions; and an amplifier to amplify said filtered signal and produce an amplified signal for transmission.

29. The system of claim 25, wherein said synchronization circuit includes a phase locked loop to detect said synchronization signal in conditions where a signal to noise ratio is greater than ten decibels.

30. The system of claim 25, wherein said synchronization circuit includes a tracking circuit to track phase and frequency of incoming signals to detect the presence of said at least one frequency signal of said sequence.

31. The system of claim 30, wherein said tracking circuit tracks said incoming signals received from a moving platform.

32. The system of claim 30, wherein said tracking circuit detects the presence of said at least one frequency signal of said sequence in conditions where a signal to noise ratio is less than ten decibels.

33. The system of claim 30, wherein said tracking circuit includes a loop filter to track said phase and frequency of said incoming signals in accordance with the following equations:

Phase: $\theta_{n+1} = \hat{\theta}_n + \hat{\phi}_{n+1} + K_\theta[\omega_n - \hat{\theta}_n]$ Frequency: $\phi_{n+1} = \hat{\phi}_n + K_\phi[\hat{\phi}_n + [\omega_n - \omega_{n-1}]]$ where $\theta$ represents the estimated phase, $\phi$ represents the estimated frequency, $\omega_n$ represents a phase signal indicating the phase information of an incoming signal with respect to a reference signal and $K_\phi$ and $K_\theta$ represent loop gain constants.

34. The system of claim 33, wherein the loop gain constants $K_\phi$ and $K_\theta$ are less than one.

35. The system of claim 30, wherein said receiving unit further includes:
a tuner to receive incoming signals of a particular frequency in accordance with control signals;
a down converter module to convert the incoming signal to an intermediate frequency signal that is directed to said synchronization circuit, wherein said synchronization circuit includes:
said tracking circuit, including:
an oscillator to generate a reference signal in accordance with control parameters;
a storage unit to store and provide frequency information relating to each said frequency signal of said sequence to said oscillator and tuner;
a mixer to mix an incoming signal with said reference signal to produce a mixed signal;
a phase detector to receive said mixed signal and produce a phase signal indicating phase information of said mixed signal;
a loop filter to receive said phase signal and produce estimates of phase and frequency; and
an accumulator to generate control parameters for said oscillator and detect the presence of a frequency signal within said sequence based on said estimates and to determine reception of each frequency signal in said sequence; and
an activation module to trigger said controller to initiate a communications session in response to said reception of said sequence.

36. The system of claim 25, wherein:
said controller controls operational modes of said unit including at least a receive mode, a transmit mode and a standby mode; and
said synchronization circuit detects said synchronization signal during said standby mode and triggers said controller to switch said unit from said standby mode to said receive mode to receive and process said information signal in response to said detection.

37. In a communications unit, a tracking circuit to detect the presence of a signal by tracking the phase and frequency of the signal comprising:
a phase detector to produce a phase signal indicating phase information of an incoming signal with respect to a reference signal;
a loop filter to receive said phase signal and produce estimates of phase and frequency; and
an accumulator to detect the presence of said signal based on said estimates;
wherein said loop filter tracks said phase and frequency of said incoming signal in accordance with the following equations:

Phase: $\theta_{n+1} = \hat{\theta}_n + \hat{\phi}_{n+1} + K_\theta[\omega_n - \hat{\theta}_n]$ Frequency: $\phi_{n+1} = \hat{\phi}_n + K_\phi[\hat{\phi}_n + [\omega_n - \omega_{n-1}]]$ where $\theta$ represents the estimated phase, $\phi$ represents the estimated frequency, $\omega_n$ represents a phase signal indicating the phase information of an incoming signal with respect to a reference signal and $K_\phi$ and $K_\theta$ represent loop gain constants.

38. The circuit of claim 37, wherein the loop gain constants $K_\phi$ and $K_\theta$ are less than one.

39. The circuit of claim 37, wherein said signal is a frequency modulated signal.

40. The circuit of claim 37, wherein said incoming signal is received from a moving platform.

41. The circuit of claim 37, wherein said tracking circuit detects the presence of said signal in conditions where a signal to noise ratio is less than ten decibels.

* * * * *